United States Patent

Baber et al.

[11] 4,057,080
[45] Nov. 8, 1977

[54] FLUID FLOW CONTROL MEMBERS

[75] Inventors: James R. Baber, Miamisburg; Ronald J. Dershem, Trotwood, both of Ohio

[73] Assignee: General Motors Corporation, Detroit, Mich.

[21] Appl. No.: 676,753

[22] Filed: Apr. 14, 1976

[51] Int. Cl.² .............................................. F15D 1/02
[52] U.S. Cl. ..................................... 138/44; 137/315; 285/DIG. 15
[58] Field of Search ............................ 138/44, 40, 37; 137/315; 285/DIG. 15, 27

[56] References Cited

U.S. PATENT DOCUMENTS 3,287,031  11/1966  Simmons et al. ............ 285/DIG. 15

FOREIGN PATENT DOCUMENTS 2,141,249  3/1972  Germany ..................... 285/DIG. 15

Primary Examiner—Richard E. Aegerter
Assistant Examiner—Frederick R. Schmidt
Attorney, Agent, or Firm—D. D. McGraw

[57] ABSTRACT

A fluid operating device has separate flow control orifices which must be properly oriented and installed. They are so constructed that they cannot inadvertently be interchanged or installed in a reverse manner. These possibilities are obviated by making one orifice body with legs extending upwardly from the main body portion. The outer edges of the legs touch a circle of larger diameter than the diameter of the main body portion. The other orifice has the upper portion of its main body portion of larger diameter than the first orifice main body portion but of a smaller diameter than the circle touching the outside of the first orifice's legs. The lower portion of the second orifice main body is of smaller diameter than the diameter of the first orifice main body. The second orifice has legs extending from the top of the main body so that a circle touching the outside of these legs has the same diameter as the upper portion of the second orifice main body. The seats for the orifice bodies are shaped to receive the orifice bodies only in their proper orientations. An attempt to install either orifice body in the wrong position will cause the body to extend above its proper assembled position so that the body retainers cannot be installed and completion of the assembly operation cannot be accomplished. Neither orifice body can be installed in the seat provided for the other orifice body. When only one orifice body and seat unit is required, the arrangement prohibits reverse installation of the orifice body.

4 Claims, 7 Drawing Figures

FLUID FLOW CONTROL MEMBERS

The invention relates to fluid flow control members and more particularly to orifice body and seat units arranged to prevent inadvertent mis-assembly of the orifice body into the seat. When two generally similar orifice body and seat units are to be assembled in a fluid operating device, the two orifice body and seat units not only prevent inadvertent mis-assembly of each orifice body into its own seat, but also prevent inadvertent mis-assembly of either orifice body into the seat of the other orifice body.

In the Drawings

Figure 1:
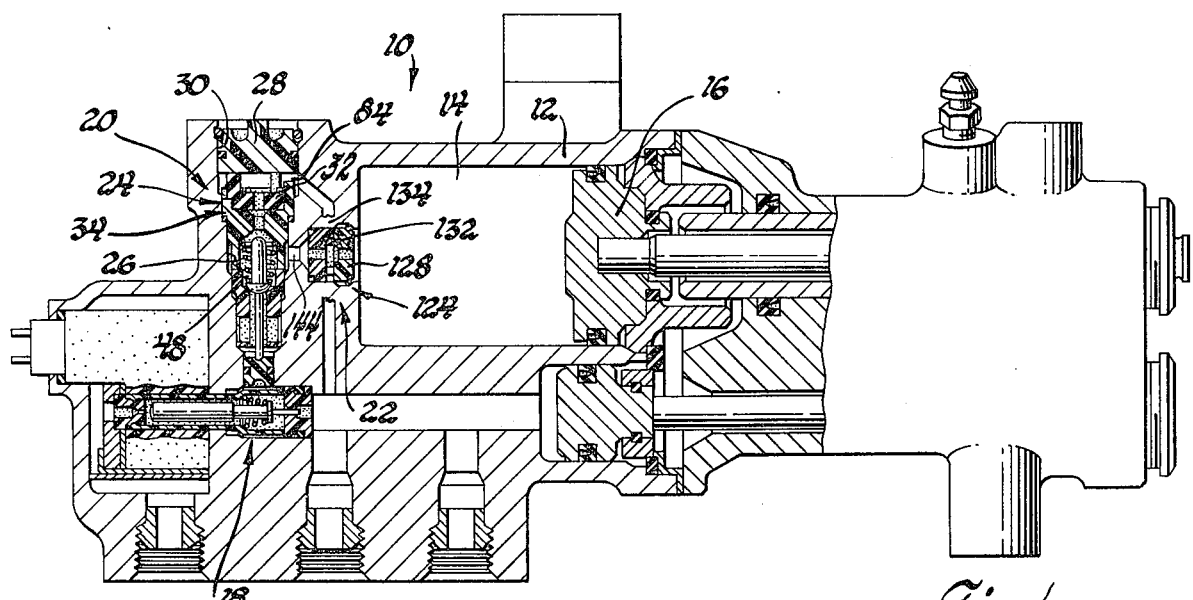
FIG. 1 is a view of a fluid operating device with parts broken away and in section and showing two orifice body and seat units embodying the invention.

The fluid operating device 10 of FIG. 1 is illustrated as being a hydraulically actuated wheel lock control modulator of the type disclosed in U.S. Pat. No. 3,810,680, entitled "Pressure Support Modulator," issued May 14, 1974 and assigned to the common assignee. Reference is therefore made to that patent for details of operation of the particular fluid operating device illustrated. The invention may be utilized in other types of fluid operating devices and is shown in such a modulator only by way of example. The modulator 10 has a housing 12 defining a fluid chamber 14 in which a displacement piston 16 is operative. It also has a modulator control mechanism 18 which controls the flow of hydraulic fluid and pressure to and from chamber 14 through an apply orifice 20 and a release orifice 22. It is the structure of these orifices and these seats that embody the invention.

Apply orifice 20 is composed of an orifice body and seat unit 24. A bore 26 in housing 12 is provided to receive unit 24. When unit 24 is properly assembled the retainer 28 can be installed in the open end 30 of bore 26 to hold unit 24 in place and also to close the bore. Unit 24 includes an orifice body 32 and a seat 34. The seal includes a seat body 36 which is received in bore 26 so that a bore shoulder 38 and a matching seat body shoulder 40 receive a seal 42 between them, with the seat being positioned in its proper axial position in bore 26. The seat body has an aperture 44 extending axially therethrough as a part of the seat body bore 46. Bore 46 opens at its lower end into a valve and spring chamber 48 and at its upper end into the bore orifice receiving section 50. Section 50 is defined by a first shoulder 52 adjacent aperture 44 and through which the aperture extends in a flared manner, a second shoulder 54 which in the particular construction shown is provided as circumferentially spaced shoulder sections located between the outer diameter of the first shoulder 52 and the outer diameter of the earlier noted shoulder 40. The seat body has a generally cylinderical portion 56 extending upwardly from shoulder 52 to terminate in an annular end surface 58. The sections forming shoulder 54 may be considered to be provided by slots 60 which give a castellated appearance to portion 56. The seat axis 62 extends axially through bore 46 and is coincident with the axis of bore 26.

Figure 2:
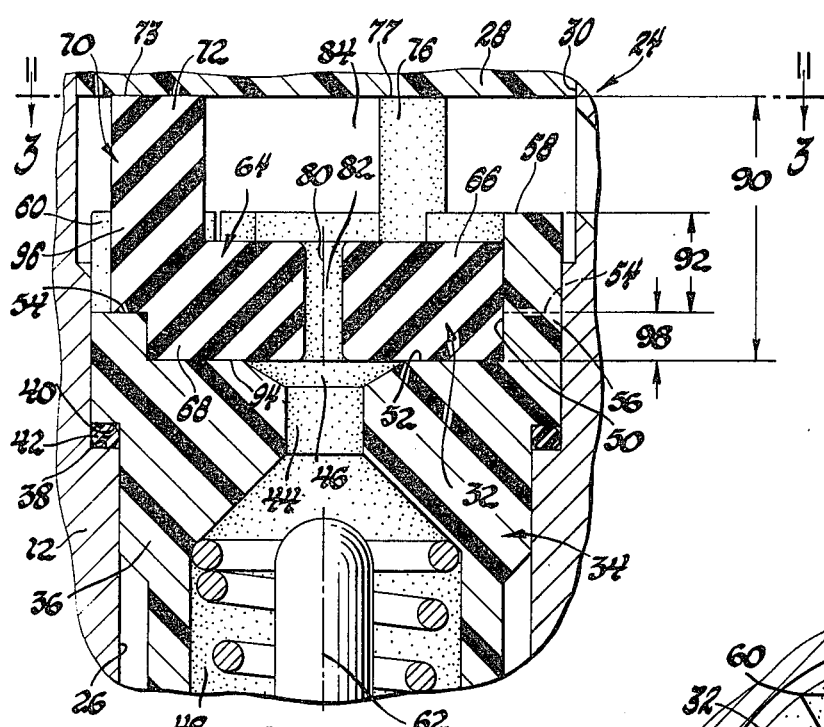
FIG. 2 is a fragmentary cross-section view of one of the orifice body and seat units of FIG. 1.
Figure 3:
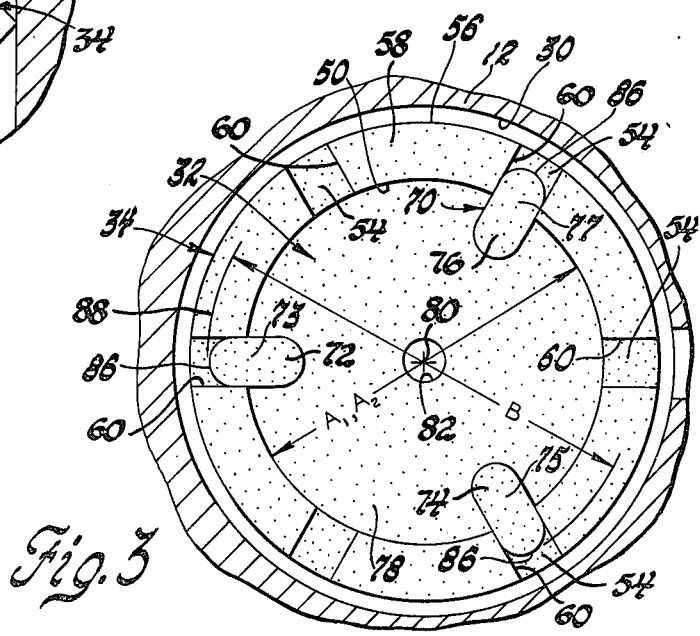
FIG. 3 is a cross-section view taken in the direction of arrows 3—3 of FIG. 2 and showing the one orifice body and seat unit of FIG. 2.
Figure 6:
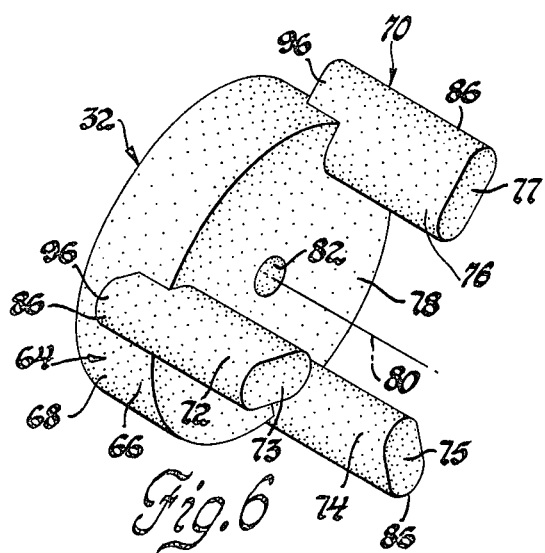
FIG. 6 is a perspective view of the orifice body which is a part of the one orifice and body unit shown in FIGS. 2 and 3.

The orifice body 32 is illustrated in proper position with its seat 34 in FIGS. 1, 2 and 3, and in perspective in FIG. 6. Orifice body 32 has a main body section 64 including an upper portion 66 and a lower portion 68. It also has a leg portion 70. The leg portion 70 is defined by at least three circumferentially spaced legs, three such legs 72, 74 and 76 being illustrated. Each leg extends from the side 78 of the main body section upper portion 66 which is away from the main body section lower portion 68. Each leg extends parallel to the axis 80 of the orifice body 32. An orifice aperture 82 is formed to extend through main body section 64 along axis 80 so that when the orifice body is in the installed position one end of aperture 82 opens into bore 46 and the other end opens into flow chamber 84. These ends may be contoured differently, thus requiring the proper axial orientation for fluid flow. The legs 72, 74 and 76 terminate at their upper ends in coplanar end surfaces 73, 75 and 77 which are engaged by the retainer 28 when unit 24 is properly installed. Legs 72, 74 and 76 therefore extend into the chamber 84 in the properly installed position.

The orifice body main body section upper portion 66 has an outer diameter identified in FIG. 3 as diameter $A_1$. The lower portion 68 has an outer diameter identified in FIG. 3 as diameter $A_2$. The radially outer edges 86 of legs 72, 74 and 76 lie on a circle 88 having a diameter B as identified in FIG. 3. For orifice body 32, diameter $A_1$ is equal to diameter $A_2$ and is also substantially equal to the diameter of the orifice receiving section 50 of bore 46. Diameter B is larger than diameter $A_1$. Since diameter $A_2$ is equal to diameter $A_1$, diameter B is also larger than diameter $A_2$. It therefore follows that diameter $A_2$ is less than diameter B. The overall axial length 90 of the orifice body 32 is greater than the axial length 92 of the seat bore orifice body receiving section 50 as measured from shoulder 54 to end surface 58.

It can be seen that when the orifice body 32 is properly installed so that the lower portion 68 has its lower side 94 in surface engagement with shoulder 52, the ends 96 of legs 72, 74 and 76 will be received in slots 60 so that they engage shoulder 54 of seat 34. When so seated, orifice body 32 has the leg upper end surfaces 73, 75 and 77 axially positioned so that retainer 28 can be installed in position. Should the assembler attempt to assemble orifice body 32 in the axially reversed direction, the legs 72, 74 and 76 will fit in slots 60, but their upper end surfaces 73, 75 and 77 will engage shoulder 54. This will cause the orifice body 32 to extend upwardly from the seat a greater distance than that permitted in order to install retainer 28. This greater distance is the axial distance 98 between shoulders 52 and 54.

Release orifice 22 is composed of an orifice body and seat unit 124. In describing unit 124, it will simplify matters to refer to upper and lower directions as when describing unit 24, even though in the particular orientation shown the "upper" direction for unit 124 is to the right and the "lower" direction is to the left. A bore 126 in housing 12 is provided to receive unit 124, the bore being shaped to integrate the seat portion 134 with the housing 12. When unit 124 is properly assembled the retainer 128 can be installed in the open end 130 of bore 26 to hold unit 124 in place. Unit 124 includes an orifice body 132 and the seat portion 134. The seat portion of housing 12 may be considered to be a seat body. It has an aperture 144 extending axially therethrough as a part of the seat body bore 126. Bore 126 opens at its lower end into the valve and spring chamber 48 and at its upper end into chamber 14. The bore orifice receiving section 150 of bore 126 is defined by a first shoulder 152 adjacent aperture 144 and through which the aperture extends in a flared manner, a second shoulder 154 located between the outer diameter of the first shoulder 152 and the diameter of the cylinder wall 156 of bore section 150. The seat body 134 has a portion defining the cylinder wall 156. Wall 156 extends upwardly from shoulder 152 to terminate in an annular end surface 158. The portion 160 of bore 126 upwardly of end surface 158 receives retainer 128 and ring 129 which holds the retainer in place in the bore. The seat axis 162 extends axially through bore 126.

Figure 4:
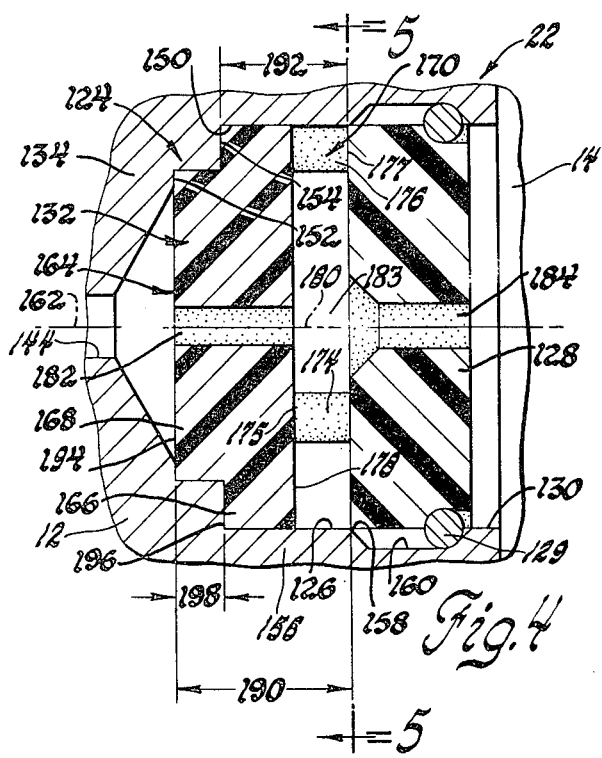
FIG. 4 is a fragmentary cross-section view of the other orifice body and seat unit shown in FIG. 1.
Figure 5:
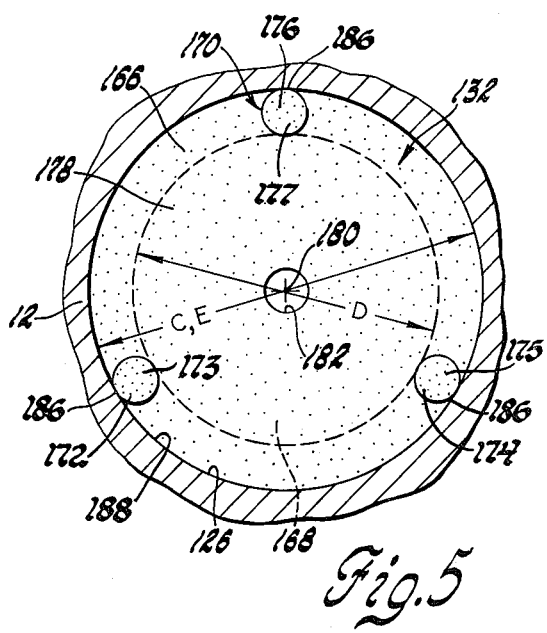
FIG. 5 is a fragmentary cross-section view of the other orifice body and seat unit shown in FIG. 4 and taken in the direction of arrows 5—5 of that Figure.
Figure 7:
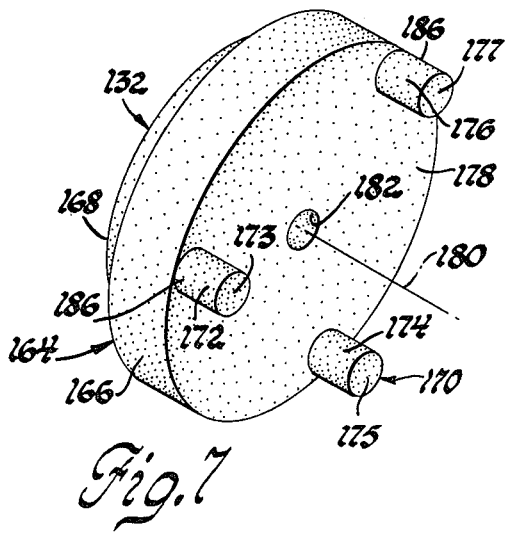
FIG. 7 is a perspective view of the orifice body which is a part of the other orifice body and seat unit shown in FIGS. 4 and 5.

The orifice body 132 is illustrated in proper position with its seat 134 in FIGS. 1, 4 and 5, and in perspective in FIG. 7. Orifice body 132 has a main body section 164 including an upper portion 166 and a lower portion 168. It also has a leg portion 170. The leg portion 170 is defined by at least three circumferentially spaced legs, three such legs 172, 174 and 176 being illustrated. Each leg extends from the side 178 of the main body section upper portion 166 which is away from the main body section lower portion 168. Each leg extends parallel to the axis 180 of the orifice body 132. An orifice aperture 182 is formed to extend through main body section 164 along axis 180 so that when the orifice body is in the installed position one end of aperture 182 opens toward aperture 144 and the other end opens into chamber 14 through flow chamber 183 and then through passage 184 of retainer 128. Flow chamber 183 is provided by the circumferential, diametrical and chordal space between legs 172, 174 and 176 and is positioned axially adjacent to main body section 164. Its side wall is defined by a part of the wall of bore 126. The ends of orifice aperture 182 may be contoured differently, thus requiring the proper axial orientation for fluid flow. The legs 172, 174 and 176 terminate at their upper ends in coplanar end surfaces 173, 175 and 177 which are engaged by the retainer 128 when unit 124 is properly installed. Legs 172, 174 and 176 therefore do not extend into the bore portion 160 in the properly installed position.

The orifice body main body section upper portion 166 has an outer diameter identified in FIG. 5 as diameter C. The lower portion 168 has an outer diameter identified in FIG. 5 as diameter D. The radially outer edges 186 of legs 172, 174 and 176 lie on a circle 188 having a diameter E as identified in FIG. 5. For orifice body 132, diameter C is equal to diameter E and is also substantially equal to the diameter of the orifice receiving section 150 of bore 126. Diameter C is larger than diameter D. Since diameter E is equal to diameter C, diameter C is also larger than diameter D. It therefore follows that diameter D is less than diameter E. The diametrical relationships of units 24 and 124 are also interrelated, with diameters C and E being smaller than diameter B but larger than diameters $A_1$ and $A_2$. The overall axial length 190 of the orifice body 132 is greater than the axial length 192 of the seat bore orifice body receiving section 150 as measured from shoulder 154 to end surface 158.

It can be seen that when the orifice body 132 is properly installed, the lower portion 168 has its lower side 194 in surface engagement with shoulder 152, and the annular lower side surface 196 of upper portion 166 engages shoulder 154 of seat 134. When so seated, orifice body 132 has the leg upper end surfaces 173, 175 and 177 axially positioned so that retainer 128 can be installed in position. Should the assembler attempt to assemble orifice body 132 in the axially reversed direction, the legs 172, 174 and 176 will fit in section 150, but their upper end surfaces 173, 175 and 177 will engage shoulder 154. This will cause the orifice body 132 to extend upwardly from the seat a greater distance than that permitted in order to install retainer 128. This greater distance is the axial distance 198 between shoulders 152 and 154. The axial length 190 of orifice body 132 is also greater than the difference between axial lengths 90 and 92 of unit 24.

Due to the diametrical and axial length relationships of portions of the two units, it can be seen that neither orifice body can be installed in position in the seat of the other. For example, an attempt to place orifice body 32 in seat 134 will result in leg ends 96 engaging shoulder 154, with the leg portion 70 then extending axially beyond annular end surface 158 so that retainer 128 cannot be installed. An attempt to place orifice body 132 in seat 34 will result in lower side 196 engaging end surface 58 so that retainer 28 cannot be installed.

What is claimed is:

1. A fluid flow controlling orifice body and seat unit arranged to prevent inadvertent axially reversed misassembly of the orifice body into the seat;

said orifice body having a disc-like main body section with an upper portion and a lower portion and an orifice aperture extending axially therethrough, and a leg portion defined by at least three circumferentially spaced legs extending axially away from said upper portion on the side thereof away from said lower portion and parallel to the axis of said aperture, the space circumferentially and diametrically and chordally between said legs and axially beyond said main body section being open, said upper portion having a first outer diameter, said lower portion having a second outer diameter, and the radially outer edges of said leg portion lying on a circle having a third diameter, one of said diameters being equal to another of said diameters and the remaining diameter being substantially unequal to said one diameter, said second diameter being less than at least one of said first and third diameters;

said seat having a cylindrically formed bore including an orifice body receiving section and a bore side wall, said receiving section having first shoulder means defining an annular seat for abutting engagement with said orifice body lower portion, second shoulder means having at least portions thereof circumferentially spaced radially outwardly and axially spaced relative to said first shoulder means for abutting engagement with another of said orifice body portions, and an annular end surface adjacent to but axially spaced from said second shoulder means, said bore side wall circumferentially surrounding at least an axial portion of said open space between said legs of said orifice body when said orifice body is received by said seat to define a flow chamber fluid connected with said orifice aperture and positioned axially adjacent to said orifice body main body section;

the overall axial length of said orifice body being greater than the axial length of said seat bore orifice body-receiving section from said second shoulder means to said end surface whereby an axially reversed mis-assembly of the orifice body into the seat results in an overall axial length of said orifice body and seat greater than the overall axial length thereof when properly assembled.

2. In a fluid operating device;

a first orifice body and seat unit as defined by claim 1;

a second orifice body and seat unit as defined by claim 1;

said first unit orifice body third diameter being greater than said second unit orifice body first diameter which is in turn greater than said first unit orifice body second diameter which is in turn greater than said second unit orifice body second diameter, thereby preventing inadvertent mis-assembly of said first unit orifice body with said second unit seat and said second unit orifice body with said first unit seat.

3. The fluid flow controlling orifice body and seat unit of claim 1 in which said legs extend along the circumferential surface of said main body section upper portion and terminate at the junction of said main body section upper and lower portions, said third diameter being greater than said first and second diameters, the radially inner edges of said leg portion extending radially inwardly beyond said first diameter.

4. The fluid flow controlling orifice body and seat unit of claim 1 in which said legs lie wholly within a circle having a diameter equal to said first outer diameter, said second outer diameter being smaller than said first outer diameter.

* * * * *